April 17, 1934.  W. GOETZELMAN  1,955,283
GROUND CONNECTION
Filed June 13, 1932
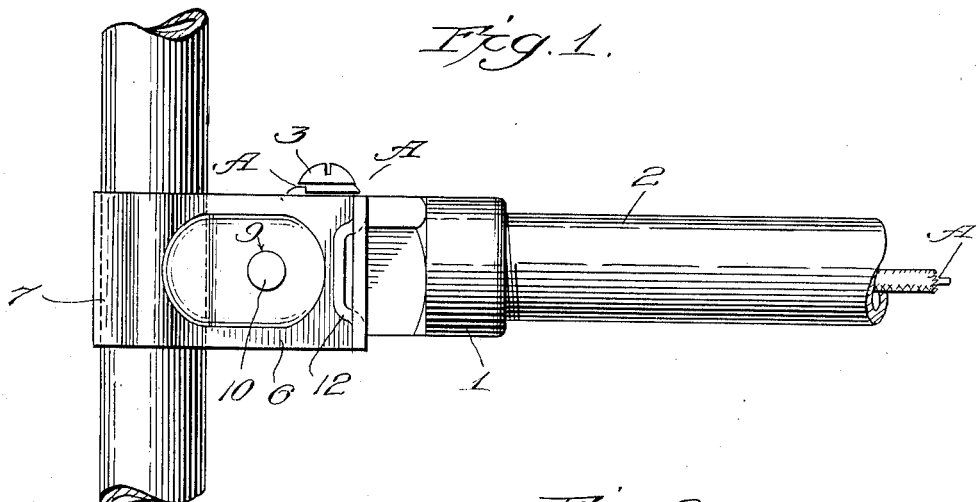
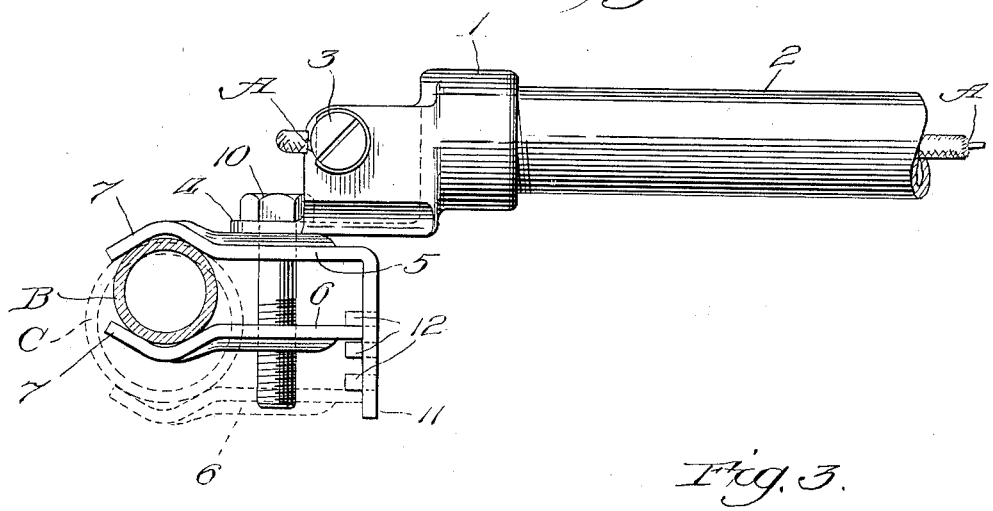
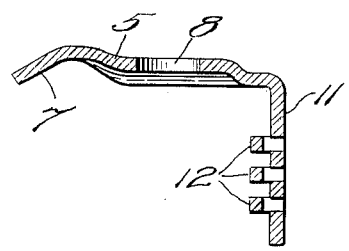
Inventor
William Goetzelman,
by Wm. F. Freudenreich,
Atty Patented Apr. 17, 1934

1,955,283

UNITED STATES PATENT OFFICE 1,955,283

GROUND CONNECTION

William Goetzelman, Chicago, Ill., assignor to Appleton Electric Company, a corporation of Illinois Application June 13, 1932, Serial No. 616,776

5 Claims. (Cl. 247—1)

The present invention has for its object to produce a very simple and inexpensive device adapted to form a secure, electrically-conductive connection between a conductor and a pipe, regardless of the size of the pipe within limits.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a bottom plan view of a device embodying the present invention clamped to a pipe; Fig. 2 is a side view of the device showing in full and dotted lines, respectively, the manner of clamping the device to a small pipe and to a large pipe; and Fig. 3 is a longitudinal central section through one of the clamping plates.

Referring to the drawing, 1 represents a socket into which may be screwed or to which may otherwise be connected a conduit 2. Extending through the conduit is an insulated conductor A, the end of which is carried through the socket and clamped to the latter by a screw 3; the insulation being, of course, removed from the wire under the head of the screw. Projecting from what may be termed the under side of the socket, on the end opposite that on which the conduit meets the socket, is a flat ear 4 for attaching the socket to the improved clamp.

The clamp comprises two plate-like members 5 and 6 to which I shall hereafter refer as plates. One end of each plate, as indicated at 7, is bent or shaped so that these two end portions will act as a pair of jaws partially to embrace a pipe inserted between them as, for example, the pipe B. Since the clamp is adapted to be applied to pipes of different sizes, I prefer to make the jaws or seats approximately in the shape of a flat V. The plate 5 has a hole 8 therethrough between the ends thereof, and the plate 6 has a corresponding hole 9 smaller than the hole 8 but screw-threaded. A bolt 10 passes freely through the ear 4 and the hole 8 in the clamping plate 5 and down through the hole 9 in the plate 6. Of course, a nut may be placed on the lower end of the bolt but, by screw-threading the hole 9, the bolt may be screwed into this hole and thus do away with the need for a nut which would be an additional part.

It is necessary to provide means for holding apart the ends of the clamping plate on the opposite side of the bolt from that on which the jaw ends are located, in order that the jaws may be tightened on a pipe. This may conveniently be accomplished by providing the inner end of plate 5 with a part extending past the corresponding end of the plate 6 and providing this member and the plate 6 with cooperating elements that will permit the plate 6 to be fulcrumed at any one of the various points along this member. I have therefore made the plate 5 much longer than the plate 6 and have bent the inner end 11 laterally at right angles to the body of the plate so as to extend across the inner end of the plate 6. The member 11 has a plurality of transverse sections or strips 12 completely severed from the same except at the ends of the strips; the strips being pressed laterally so as to form projecting bows spaced from each other a distance slightly greater than the thickness of the adjacent end of the plate 6. The inner end of the plate 6 may therefore be inserted under any one of the bow-shaped strips which therefore forms a fulcrum about which the plate 6 may swing as the bolt or screw is tightened to draw the outer end of this plate against one side of a pipe. In Fig. 2 I have shown the plate 6 engaged with that strip or shoulder closest to the plate 5 which is the adjustment suitable when the device is clamped to a small pipe such as the pipe B. When the plate 6 is engaged under the strip or shoulder 12 nearest the free end of the member 11, as shown in dotted lines in Fig. 2, the body portions of the plates 5 and 6 will remain parallel even though the plates are gripping a large pipe C, such as indicated in dotted lines in Fig. 2.

It will therefore be seen that the means for fastening the socket to a pipe or the like consists of three simple pieces, one of which is a bolt or screw. Not only do these three pieces serve effectively to secure the socket to pipes of various sizes, but they form a swivel or hinge joint for the socket so that the ground connection may be made regardless of whether the conduit and the pipe are at right angles to each other or not.

I have referred to the members 5 and 6 as plates because they are preferably made wide and usually will be in the form of sheet metal stampings. However, these elements may be otherwise made and be other shapes and still be regarded as plates in the sense that I use this term.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In combination, an angle plate, one wing of the angle plate having a plurality of projecting shoulders distributed lengthwise thereof on the inner side, a second plate adapted at one end to underlie the second wing and be engaged at one end with any one of said shoulders, a fastening device extending through the second wing of the angle plate and through said second plate, said second wing and said second plate being shaped outwardly from said fastening to grip an interposed pipe or the like when the fastening is tightened.

2. In combination, a device to be grounded, two parallel clamping plates the first of which underlies in contact with said device, a single fastening passing through said plates between the ends thereof and through a part on said device, the outer ends of said plates being shaped to grip a pipe or the like placed between them, a member fixed to the inner end of the first plate and projecting at right angles thereto past the inner end of the second plate, and cooperating elements on said member and on the inner end of the second plate to permit the second plate to be fulcrumed at any one of various positions distributed along the length of said member, whereby said plates may remain approximately parallel whether the pipe placed between the same is large or small.

3. In combination, a socket for the end of a conduit, said socket having a projecting ear, a clamping plate underlying and engaging with said ear at a point between the ends of the plate, a single fastening extending through said ear and through both of said plates and forming a hinge connection between the plates and the socket, the outer ends of the clamping plates being shaped to grip a pipe placed between the same, a member fixed to the inner end of the first clamping plate and extending at right angles thereto past the inner end of the second clamping plate, and cooperating elements on said member and the adjacent end of the second plate to permit the second plate to be fulcrumed at any one of various points distributed lengthwise of said member.

4. In combination, a sheet metal angle plate, one wing of the angle plate having a plurality of projecting shoulders punched out of the material thereof and distributed lengthwise thereof on the inner side, a second sheet metal plate underlying the second wing of the angle plate and adapted to be engaged at one end with the under side of any one of said projecting shoulders, and a fastening device extending through said second plate and the overlying wing of the angle plate.

5. In combination, a sheet metal angle plate, one wing of the angle plate having a plurality of projecting shoulders punched out of the material thereof and distributed lengthwise thereof on the inner side, a second sheet metal plate underlying the second wing of the angle plate and adapted to be engaged at one end with the under side of any one of said projecting shoulders, and a fastening device extending through said second plate and the overlying wing of the angle plate, the free end of said second wing outwardly from said fastening device and the corresponding end of said second plate being in the form of jaws adapted to grip a pipe or the like placed between them.

WILLIAM GOETZELMAN.